Patented Oct. 25, 1938

2,134,256

UNITED STATES PATENT OFFICE

2,134,256

PROCESS OF PRODUCING AND REFINING ORGAN EXTRACTS

Per Laland and Aage Klem, Oslo, Norway, assignors to Nyegaard & Company, Aktieselskap, Oslo, Norway No Drawing. Application January 21, 1936, Serial No. 60,132. In Norway January 26, 1935

5 Claims. (Cl. 167—74)

This invention relates to the manufacture and refining of antianemic preparations and has for its object a process of treating organ extracts by means of which it is possible to obtain highly active antianemic products.

The present invention is based on the discovery that phenols and other compounds with phenol character, such as cresols, etc., and mixtures of such compounds are suitable solvents for antianemic matter of the type contained in liver.

An important feature of the present invention consequently consists in the use of such compounds (of phenolic character) as a solvent in the production or concentration of antianemic materials.

A suitable method of carrying the invention into effect consists in shaking an aqueous organ extract containing antianemic matter with the said solvent.

It has been found that particularly good results are attained when the aqueous solution treated has a pH of between about 6.5 and about 8.

Another suitable embodiment of the invention consists in subjecting adsorption products containing the substance in question to lixiviation with compounds of phenolic character.

Other methods of carrying the invention into effect will suggest themselves to the biological or pharmaceutical chemist.

As above mentioned, the compounds of phenolic character may be employed in a pure condition or together with suitable diluents, such as amyl alcohol, propyl alcohol and other organic extraction agents.

As examples of organ extracts which may be treated with particular advantage in accordance with the present invention may be mentioned liver extracts in an aqueous or non-aqueous condition, but other organ extracts which contain substantial amounts of antianemic matter may also be treated according to the invention, provided that the bioactive substances to be recovered or concentrated in the extract are of a basic or ampholytic character or of such a nature as not to produce precipitates with the conventional protein deposition agents.

In the case of liver extracts it has been found to be possible by means of one single shaking with phenol to obtain practically complete transfer to the phenol of the antianemic principle and further also of those other constituents of the extract which are capable of being precipitated with phosphotungstic acid.

The substances taken up by the phenol (or the like) may be recovered for example by precipitation with alcohol, acetone, etc., or chloroform or the like and quantitatively shaken out with water.

In the experiments hitherto made, no substantial selective action has been observed in connection with the washing with phenol. In the case of liver extracts, the antianemic principle—and in general such substances which produce precipitates with phosphotungstic acid—are immediately and completely dissolved in the phenol. This seems to indicate that the substances in question are basic or ampholytic nitrogenous bodies. This assumption is also supported by the observation that ready solution does not take place at a very low pH.

On the other hand, a selective action has been observed in connection with the redissolution by shaking with water, after the addition of chloroform or ether. The coefficient of selection is, however, so small that it is possible to obtain a quantitative redissolution by 3 to 5 times washing (shaking) with comparatively small quantities of water.

When operating according to the invention, it is possible to obtain very efficient and highly refined extracts, freed from the greater part of the inorganic and other undesirable constituents.

In the case of liver, it is thus possible to obtain an efficient extract of about 0.30 per cent calculated on the original quantity of liver.

Example 1

1 liter of a liver extract which has been freed from proteins, by a previous treatment, having a pH value between 6.5 and 8, is shaken with about 200 cm.³ of liquid phenol of 90 per cent or with about 180 g. of molten phenol of 100 per cent.

The phenol phase is separated from the aqueous phase, and this latter is washed a couple of times with small quantities of phenol. The total phenol extract is mixed with 4–5 times its own volume of ether (chloroform or the like) and is then shaken 3–5 times with comparatively small quantities of water.

The resulting aqueous extract has a percentage of dry matter which is fairly constant, corresponding to about 0.30 per cent of the original quantity of liver.

Example 2

A liver extract containing a substantial amount of antianemic matter is instilled on a pH value of about 3 by means of sulphuric acid. At a temperature of 40–50° C. this extract is thereupon mixed with acidic phosphotungstic acid in excess and is then left standing for cooling, whereupon the precipitate is separated off by centrifugal treatment. The separated precipitate is dissolved by the addition of alkali ($Na_2CO_3$ or the like) to a pH value of 7-8, the resulting solution being thereupon shaken with phenol. The product is then further treated as in Example 1.

Example 3

Dried liver extract is lixiviated with liquid phenol. The resulting phenol extract contains certain undesirable substances, which would not have been present, if the phenol solution had been obtained by shaking out in the presence of water.

In order to remove these substances, the phenol extract is shaken with water, which will hereby take the said undesirable constituents. After having been separated from the aqueous phase, the phenol extract is further treated in the manner specified in Example 1 or 2.

The present invention also comprises a method in which an organ extract (such as liver extract) in solution is treated with active carbon or other adsorption agent (such as fuller's earth, silica gel and the like), which is thereupon by suitable means caused to give off adsorbed matter.

It is possible in this way to obtain a concentrate of the antianemic principle contained in the organ extract (liver extract).

The separation of adsorbed matter from the adsorption agent employed may suitably be brought about by means of phenol, cresol, tricresol or other substances of phenol-like character in a diluted or non-diluted condition in that it has been found that the antianemic fraction is capable of being readily and completely elutriated by substances of phenol-like character.

By a suitable preparatory treatment (preelutriation) of the adsorption agent by washing (elutriating) the mass with water containing phenol or the like (such as for example a 6 per cent solution in water), it is possible to bring about removal of simultaneously adsorbed inactive substances so that by a treatment with liquid or molten phenol or the like a more pure concentrate of antianemically active substances is produced.

The said elutriation of the adsorption agent plus adsorbate as well as the mentioned washing with water containing phenol prior to the elutriation with phenol is applicable with advantage, not only on liver extract, but also on other organ extracts or solutions or dispersions respectively containing antianemic matter of the type contained in liver.

It is known that adsorption and elutriation (often repeated several times) are frequently made use of to obtain biological substances in a more pure condition than it is otherwise possible to produce same. To judge about the possibility of employing such methods on a commercial scale, two conditions are primarily to be considered:

1. That it is possible by moderate amounts of adsorption agent to adsorb the substances in question.

2. That it is possible to elutriate the adsorbed substances from the adsorption product.

The first-named condition is in many instances comparatively easy to fulfill, in that several bodies mostly of comparatively high molecular weight can be adsorbed by active carbon and other commercial adsorption agents. On the other hand, it is frequently very difficult to fulfill the second condition and to obtain a fairly quantitative elutriation.

From these reasons several products exist, for which the adsorption and elutriation method is not applicable.

For the treatment of liver extracts the method has apparently not been considered applicable, in that as far as known it has not hitherto been suggested to treat liver extract in this manner.

Example 4

A liver extract (more or less completely purified, free from or containing proteins) in a quantity representing 10 kg. of fresh liver (or also a corresponding quantity of a commercial liver extract in solution) is shaken with 50 g. of high grade active carbon for about 4 hours at 40-50° C. The carbon is separated off by filtration or centrifugal treatment, washed with water and supplied with 25 g. molten phenol. The mass is stirred and then left standing for about 1 hour. The liquid is separated off by filtration or centrifugal treatment. The carbons are washed with phenol.

To the entire quantity of phenol elutriate is mixed a comparatively larger quantity of alcohol, acetone or the like. Or the phenol-solution is mixed with 3-5 times its own volume of ether, chloroform or the like. It is thereupon shaken out 3-5 times with relatively smaller quantities of water. This method applied to an extract free from proteins results in an efficient extract, having a percentage of dry matter of about 0.5% calculated on initial liver material.

Example 5

The process described in Example 4 was employed, but with the difference that the adsorption product before the elutriation with phenol was subjected to washing with water containing phenol (in a quantity of about 6%), until the filtrate was colourless.

Example 6

The method of Example 5 was employed, but in this case a solution was employed which on a preceding stage of the process has been supplied with phenol or like substance.

The process described in the above examples is applicable not only to the treatment of extracts of the organs specifically mentioned but also to the treatment of any organ extract of the character referred to in the general part of the description.

By the method specified in these examples, when used for the refining of liver extracts, final products have been obtained which have a percentage of dry matter of above 0.3% calculated on the initial liver material.

In some of the above examples the use of phosphotungstic acid has been mentioned. As a matter of course, these substances may be substituted for by various other substances known to be equivalent to the phosphotungstic acid (such as for example phosphomolybdenic acid, arsenomolybdenic acid, etc.).

As will be understood from the above description, the materials subjected to the lixiviation with phenol or other compounds of phenolic character may be an extract or concentrate in a dry, moist or dissolved condition as well as any other mixture of substances comprising the bioactive substance to be recovered.

We claim:

1. A process for the refining of liver extracts, comprising the steps of subjecting the extract to lixiviation with a fluid substance comprising essentially a phenol, mixing the resultant phenolic extract with a volatile organic solvent immiscible with water, and extracting the resultant mixture with aqueous liquid.

2. A process for the refining of liver extracts, comprising the steps of subjecting an aqueous liver extract to lixiviation with a fluid substance comprising essentially a phenol, separating the phenolic phase from the aqueous phase, mixing the phenolic phase with a volatile organic solvent immiscible with water, and extracting the resultant mixture with aqueous liquid.

3. A process for the refining of liver extracts, which comprises the steps of adding an adsorption agent to an aqueous solution of the extract, subjecting the adsorbed matter to the dissolving action of water containing a small percentage of phenol, subjecting the remaining adsorbate together with the adsorption agent to elutriation with a liquid comprising essentially a phenol, mixing the resultant phenolic extract with a volatile organic solvent immiscible with water, and extracting the resultant mixture with aqueous liquid.

4. A process for the refining of liver extracts, which comprises the steps of adding phosphotungstic acid to an aqueous solution of the extract, dissolving the precipitate by means of an added alkaline substance, subjecting the resultant solution to lixiviation with a fluid substance comprising essentially a phenol, separating the phenolic phase from the aqueous phase, mixing the phenolic phase with a volatile organic solvent immiscible with water, and subjecting the resultant mixture to extraction with aqueous liquid.

5. A process according to claim 1, in which the liver extract is an aqueous extract having a pH value of between about 6.5 and about 8.

PER LALAND.
AAGE KLEM.